Patented May 3, 1932

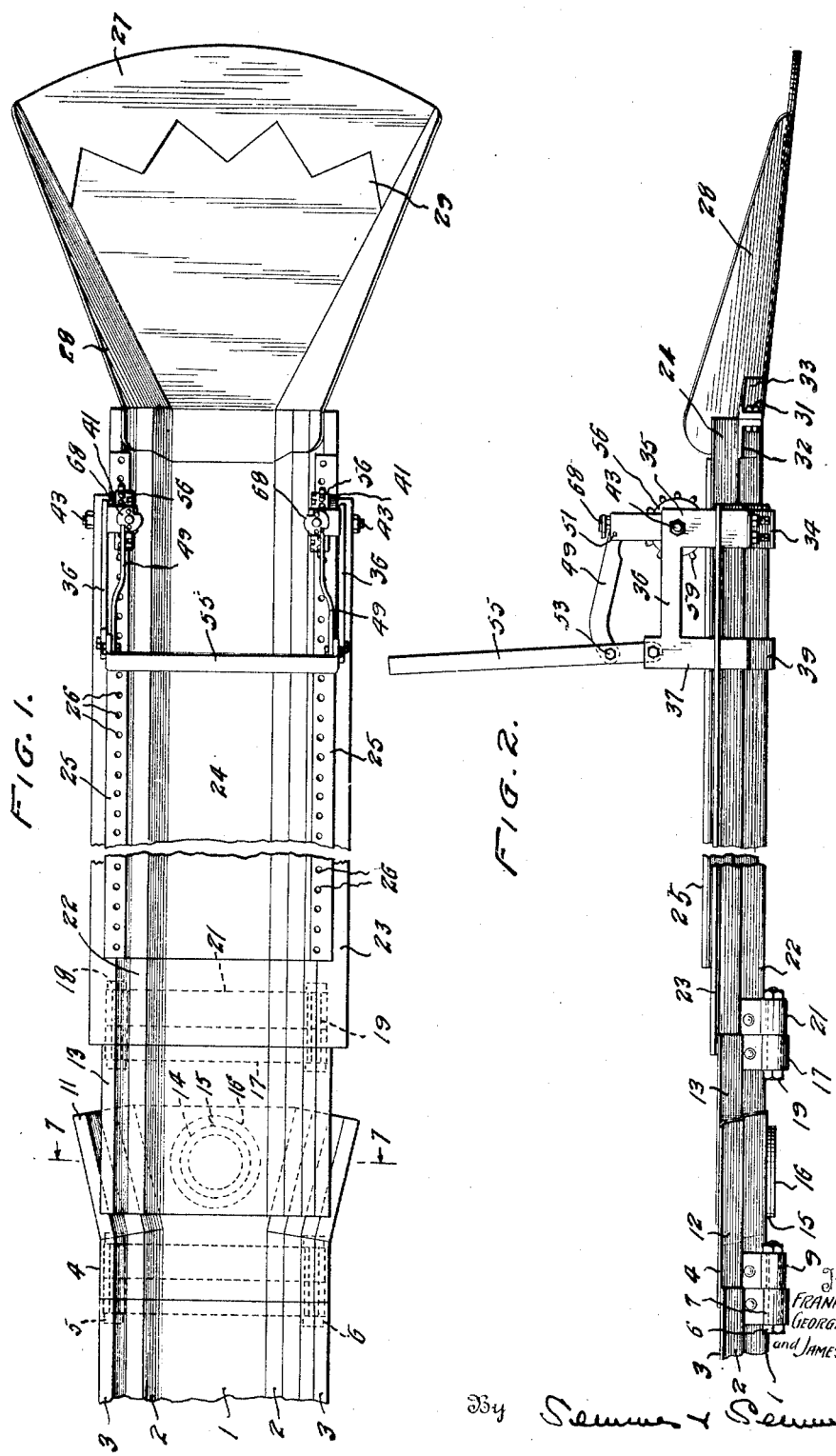

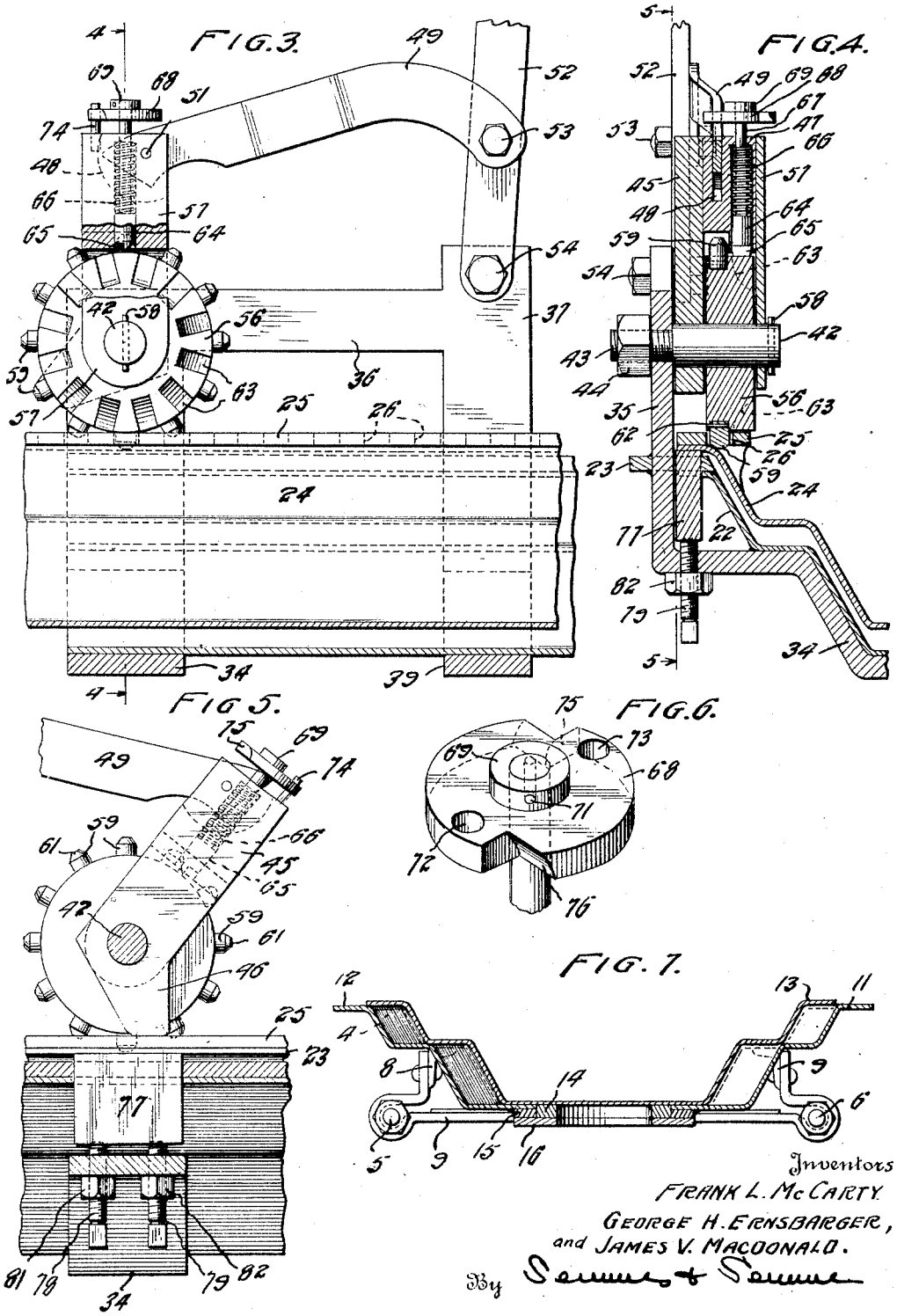

1,856,191

UNITED STATES PATENT OFFICE

FRANK L. McCARTY, OF ROCK SPRINGS, WYOMING, GEORGE H. ERNSBARGER, OF SOUTH GATE, CALIFORNIA, AND JAMES V. MACDONALD, OF ROCK SPRINGS, WYOMING, ASSIGNORS, BY MESNE ASSIGNMENTS, TO GOODMAN MANUFACTURING COMPANY, OF CHICAGO, ILLINOIS, A CORPORATION OF ILLINOIS

FEEDING MECHANISM FOR RECIPROCATING CONVEYERS

Application filed February 25, 1928. Serial No. 256,885.

This invention relates in general to a loading and discharging attachment for a reciprocating conveyer and more particularly has reference to an attachment which will operate to gather and distribute material as well.

Previous to this time, in loading devices of this character, certain portions of the troughs making up the attachment have been subjected to excessive wear so that a frequent replacement of the troughs has ofttimes been necessary. Also, the operating mechanisms heretofore used have been constructed to operate in two quadrants which has necessitated a greater amount of head room in a mine working than would otherwise have been required. Further, the swivel joints employed in the past to allow lateral movement of a loading or a discharging attachment, have limited the application of a conveyer, in many instances, as they have generally been formed apart from the attachment and hence have not provided for movement of the conveyer except at the point of attachment.

An object of this invention is to provide a loading or discharging attachment for a reciprocating conveyer that may be extended or retracted when the conveyer is in motion or at rest.

Still another object of this invention is to provide a loading or discharging attachment for a reciprocating conveyer that may be moved laterally when the conveyer is in motion or at rest.

Another object of this invention is to provide a loading or discharging attachment for a reciprocating conveyer that will load, transport and/or discharge material on or from the conveyer.

Still another object of this invention is to provide a loading or discharging attachment for a reciprocating conveyer that will gather and transport or distribute material over a wide arc or a large area.

A further object of this invention is to provide a loading or discharging attachment for a reciprocating conveyer having an improved braking attachment.

A still further object of this invention is to provide a loading or discharging attachment for a reciprocating conveyer having an improved operating mechanism.

A still further object of this invention is to provide a loading or discharging attachment for a reciprocating conveyer having an improved swivel joint.

With these and other objects in view which may be incident to our improvements, the invention consists in the parts and combinations to be hereinafter set forth and claimed, with the understanding that the several necessary elements comprising our invention, may be varied in construction, proportions and arrangement, without departing from the spirit and scope of the appended claims.

In order to make our invention more clearly understood, we have shown in the accompanying drawings means for carrying the same into practical effect, without limiting the improvements in their useful applications to the particular constructions, which for the purpose of explanation, have been made the subject of illustration.

This invention contemplates generally a loading or discharging device for the handling of any and all materials for any and all projects such as underground workings, surface workings, stock piles, mills and various other industrial or other enterprises. It is intended to be attached to the end or ends of any suitable reciprocating conveyer, that may be extended or retracted or moved laterally at the will of an operator for the purpose of loading, transporting and discharging and gathering and distributing any and all materials in any and all places.

More specifically the invention consist of an attachment made up of a steel conveyer pan section having a plurality of perforated bars welded on the usual flanges to form racks, nested in a bottom pan, and provided at the end with a shoveling head. An operating mechanism is mounted on the lower pan over the rack pan adapted to extend or retract the shovel with respect to the bottom pan in which it is free to slide.

In the drawings forming a part of this specification:

Figure 1 is a top view of the loading or discharging attachment shown attached to the end of a reciprocating conveyer.

Figure 2 is a side elevational view of the attachment shown in Figure 1.

Figure 3 is a side elevational plan view of the extending and retracting mechanism.

Figure 4 is a front elevation sectional view taken on the line 4—4 of Figure 3.

Figure 5 is a side elevation plan view taken on the line 5—5 of Figure 4.

Figure 6 is a perspective view in plan of the pawl operating device.

Figure 7 is a front elevation sectional view taken on line 7—7 of Figure 1 showing the swivel joint.

Referring by numerals to the drawings in which the same and similar elements are designated by like symbols of reference throughout and more particularly to Figures 1 and 2, there is shown the end of a conveyer trough 1 formed with the usual angular side walls 2 and top flanges 3.

A trough section 4 of similar configuration to the trough section 1 is attached to the end thereof by a plurality of bolts 5 and 6. The bolts 5 and 6 are adapted to engage apertures formed on each end of a strap 7 riveted to a plurality of angle irons 8 and 9 attached to the bottom of the trough section 1. The end of the trough 4 is nested in the end of the trough 1 and the over-lapping troughs connected by the bolts 5 and 6 extending through the ends of the strap 7 and a strap 9 riveted to the bottom of the trough 4 in the same manner as the strap 7.

The end of the trough section 4 is flared at 11 and 12 adapted to receive the end of a trough section 13. A ring 14 is welded on the bottom of the trough section 13 adapted to fit in an aperture cut in the bottom of the flared section 4. A ring 15 having an inside circumference coinciding with that of the outside circumference of ring 14 is welded to the bottom of the flared section 4 and a ring 16 having an inside circumference coinciding with that of the ring 14, and an outside circumference equal to the outside circumference of ring 15 is welded to the ring 14. The flared trough 4 and the trough section 13 through the swivel joint formed by the rings 14, 15 and 16 make up a conveyer trough section allowing lateral disposition of adjacent pans or of an attachment to be hereinafter described.

A strap 17 is riveted on the end of the trough section 13, having apertures formed at the ends adapted to receive bolts 18 and 19. The bolts 18 and 19 also engage apertures in each end of a strap 21 riveted to the bottom of a pan 22, forming a part of the loading and discharging attachment comprising the subject matter of this invention. It is manifest, however, that any number of trough sections may be interposed between the swivel joint sections and the attachment.

The pan 22 is provided with bars 23 welded on the tops of the flanges and is adapted to receive a pan 24 also provided with bars 25 welded to the top flanges as shown in Fig. 4, and free to slide on pan 22. The bars 25 welded to the flanges on the pan 24 are provided with a series of apertures 26 to form longitudinal racks.

A shovel 27 having flared sides 28 and a rounded serrated reinforcing plate 29 fixed on the top is attached to the end of the pan 24 through bolts 31 engaging adjacent angle irons 32 and 33 fixed on the respective ends of the pan and the shovel.

A frame 34 having upwardly extending supports 35 is welded to the bottom of the pan 22. The supports 35 of the frame are formed with longitudinal sections 36 cast integral with the frame together with uprights 37 formed on a frame 39 welded to the bottom of the trough 22 to the rear of the frame 34. A plurality of pins 42, having reduced threaded extensions 43 are fitted in apertures in the support sections 35 of the frame and the ends held by nuts 44. A pair of brackets 45, having elongated toes 46 are mounted on the pins 42 against the supports 35. The toes 46 formed integral with brackets 45 are adapted to act as cams and contacts with the rack bars 25 when the brackets are rotated clockwise. Two casings 47 formed with slots 48 adapted to receive the ends of a plurality of connecting arms 49 held in the slots by pins 51, are juxtaposed against the brackets 45 and held on the pins 42. The connecting arms 49 are hinged on levers 52 pivoted on the upright supports 37 by bolts 54, and the levers 52 are hinged on bolts 53 and operated by an integral handle 55.

When the handle 55 is pushed forward, the toes 46 are made to press down on the bars 25, mounted on the flanges of the trough 24, establishing a contact between blocks 77, passing through trough 22, and bars 23, and the lower side of the flange of trough 24, upon which is superimposed bars 25, thus binding troughs 22 and 24 together. When the conveyer is in the process of normal operation, the trough 24 is clamped on the trough 22 so that the shoveling head 27, mounted on the pan 24, will reciprocate with the conveyer.

If it is desired to advance the shoveling head into the material which is being loaded the motion of the conveyer is anticipated and the handle 55 is pulled to the rear slightly in advance of the backward stroke of the conveyer. The motion of the handle is transferred through the connecting arms 49 to the brackets 45 so that the toes 46 are released and the lower pan 22 is allowed to be drawn from underneath the pan 24 carrying the shovel head, the distance of the conveyer's stroke, whereupon the handle 55 is again tilted forward and the two troughs locked together. This operation may be repeated so that the trough 24 may be advanced to any desired extent within the limits of its length, the distance of one stroke of the conveyer during each operation.

If it is desired to withdraw the shoveling head, the operation is reversed, that is the toes are released by pulling back the lever in anticipation of the forward stroke, and the pan 24 allowed to recede within the pan 22 the distance of the stroke, whereupon the flanges are again clamped together by pushing forward the handle 55 and bringing the toes 46 into position. As the pan 24 is not rigidly mounted on the pan 22, if the shoveling head 27 contacts with any obstacle, the pan 24 on which it is mounted, may be forced backward against the pressure exerted by the toes 46 so that damage to the attachment may be avoided.

A plurality of disks 56 are mounted on the pins 42 against the brackets 45 and bars 57 having the tops welded on the sides of the casings 47 and held in place at the bottoms by pins 58 extending through the ends of the pins, 42. A plurality of teeth 59 having tapered ends 61 are seated, around one side of the outer periphery of the disks 56 and fixed in place by a series of pins 62 extending through the sides of the disks. On the inside periphery of the disks are cut a series of tapered grooves 63, staggered with respect to the teeth 59 so that in effect the disks 56 form at once, sprocket and ratchet wheels.

The teeth 59, seated in the outside periphery of the disks 56 are adapted to engage the apertures 26 formed in the bars 25 welded on the flanges of the trough 24 so that when the trough 24 is slid with respect to the bottom pan 22 the disks 56 are caused to rotate by act of the engagement of teeth which have the same pitch as the perforations in the bars 25, which form the racks.

A trigger 64, having a notched end 65 is seated in a bore 66 formed in the casing 47 welded between the brackets 45 and the bars 57 and mounted on a rod 67, extending through an aperture in the top of the casing. A helical spring 66 is mounted around the rod 67 between the trigger 64 and the top of the casing 47 so that the notched end 65 on the trigger 64 is held by the force of the spring in one of the slots 63. A disk 68, having an integral collar 69 is fixedly held on the top of the rod 67 by a pin 71 so that when the rod is raised against the force of the spring and the trigger disengaged from the grooves 63, the plunger is caused to concomitantly revolve with the disk. In this manner the notch 65 on the trigger 64 acts as a one-way pawl operating against the force of the spring 66, which may be reversed so that the disk 56 can rotate in the opposite direction.

A plurality of oppositely disposed apertures 72 and 73 are bored through the disk 68 adapted to engage a pin 74 seated in the top of the casing 47, so that the plunger 64 may be fixed in engagement with the notches 63 or held out of position on the top of the pin 74. The disk 68 is also formed with a plurality of oppositely disposed cut-away portions 75 and 76 adapted to afford clearance to prevent the connecting rods 49 raising the trigger out of engagement with the notches 63 when the handle 55 operating the levers 52 is pushed to a vertical or a rear position.

When the conveyer is in operation the trough 24 may be extended by setting triggers 64 to rotate disks 56 (Figure 2) counter clockwise, pulling handle 55 rearward in anticipation of the backward stroke of the conveyer, effecting a partial rotation of disks 56, which in turn extends trough 24 with relation to trough 22. Then in anticipation of the forward stroke of the conveyer the lever 55 is moved to the extreme forward position, causing the toes 46 to clamp trough 24 to the conveyer trough 22, releasing the triggers 64 from grooves 63 by the action of the forward end of connecting arms 49, engaging the lower side of disks 68 (Figures 5 and 6), the disks 56 free to rotate clockwise (Figure 2) in the event an obstacle sufficient to overcome the frictional connection between trough 24 and conveyer trough 22 is encountered.

When the conveyer is in operation the trough 24 may be retracted by setting triggers 64 to rotate disks 56 (Figure 2) clockwise, pulling handle 55 rearward in anticipation of the forward stroke of the conveyer, effecting a partial rotation of disks 56, which in turn retracts trough 24 with relation to trough 22, then in anticipation of the backward stroke of the conveyer the lever 55 is moved to the extreme forward position, causing the toes 46 to clamp trough 24 to the conveyer trough 22, the trough 24 retracted by the backward stroke of the conveyer.

The bars 23 are provided with oppositely disposed rectilinear apertures in alignment with the frame 34 adapted to receive a plurality of blocks 77. The blocks are held in position against the bottom of the flanges on the pan 24 by a plurality of bolts 78 and 79 threaded through the bottom of the frame 34, and fixedly secured by lock nuts 81 and 82. The blocks 77 are adapted to provide a rigid support for the pan 24 when the clamps 45 are applied to the racks 25, and also to afford an adjustment of the braking surface between the pans 22 and 24. The bolts 78 and 79 and the lock nuts 81 and 82 are provided to compensate for wear on the blocks so that a proper adjustment may be maintained at all times.

There is accomplished by this invention, a loading or discharging attachment for a reciprocating conveyer that will load transport or discharge material on or from a conveyer that may be extended or retracted or moved laterally while the conveyer is inoperative or in motion and will gather or distribute material over a wide arc or a large area.

While we have shown and described the preferred embodiment of our invention, we wish it to be understood that we do not confine ourselves to the precise details of construction herein set forth, by way of illustration, as it is apparent that many changes and variations may be made therein, by those skilled in the art, without departing from the spirit of the invention, or exceeding the scope of the appended claims.

We claim:

1. A loading and discharging attachment for a reciprocating conveyer comprising a trough slidable with respect to the conveyer, a combination sprocket wheel and ratchet adapted to extend or retract the trough and means to operate the wheel.

2. A loading and discharging attachment for a reciprocating conveyer comprising a trough slidable with respect to the conveyer, a plurality of combination sprocket and ratchet wheels adapted to engage the trough and means to operate the wheels.

3. A loading and discharging attachment for a reciprocating conveyer comprising a trough having racks formed on the flanges, a plurality of combination sprocket and ratchet wheels positioned above the trough adapted to engage the racks and means to operate the wheels.

4. A loading and discharging attachment for a reciprocating conveyer comprising a trough having racks formed on the flanges, a plurality of combination sprocket and ratchet wheels positioned above the trough adapted to engage the racks and a reversible pawl adapted to engage the wheels.

5. A loading and discharging attachment for a reciprocating conveyer comprising a bottom trough adapted to be fixed to the conveyer, a trough having racks formed on the flanges mounted in the bottom trough, slidable with respect to the conveyer, a plurality of combination sprocket and ratchet wheels adapted to cooperate with the flanges on the slidable trough mounted on the bottom trough, and means to operate the wheels.

6. A loading and discharging attachment for a reciprocating conveyer comprising a bottom trough adapted to be fixed to the conveyer, a trough having racks mounted on the flanges nested in the bottom trough, slidable with respect to the conveyer, a plurality of combination sprocket and ratchet wheels adapted to cooperate with the racks, a reversible pawl adapted to engage the wheels and means to rotate the pawl.

7. A loading and discharging attachment for a reciprocating conveyer comprising a bottom trough adapted to be fixed to the conveyer, a trough nested in the bottom trough, slidable with respect to the conveyer, means cooperating with the nested trough to allow extension or retraction of the trough with respect to the bottom trough and stationary means fixed on the bottom trough to support the nested trough out of contact therewith and adjustable to compensate for wear.

8. A loading and discharging attachment for a reciprocating conveyer comprising a flanged bottom trough adapted to be fixed to the conveyer, a flanged trough nested in the bottom trough, slidable with respect to the conveyer, means cooperating with the nested trough to allow extension or retraction of the trough with respect to the bottom trough and means adjustably fixed on the bottom trough to support the flanges of the nested trough out of contact therewith.

9. A loading and discharging attachment for a reciprocating conveyer comprising a flared trough section having an aperture through the bottom, a trough section having a ring fixed to the bottom adapted to engage the aperture in the flared trough section, and means to fix the ring in the aperture on the flared trough.

10. A loading and discharging attachment for a reciprocating conveyer comprising a flared trough section having an aperture through the bottom, a ring fixed around the aperture, a trough section having a ring fixed to the bottom adapted to engage the aperture and the ring in the flared trough section, and a ring fixed to the ring on the trough to fix the ring in the aperture on the flared trough.

11. A loading and discharging attachment for a reciprocating conveyer comprising a trough section slidable with respect to the conveyer, a combination sprocket wheel and ratchet adapted to extend or retract the trough, means by which the wheel may be operated, and means forming the wheel operating means to prevent sliding of the trough with respect to the conveyer.

12. A loading and discharging attachment for a reciprocating conveyer comprising a flanged trough section slidable with respect to the conveyer, means to extend or retract the trough, means to operate the extending and retracting means by a lever through a connecting arm and means operated by the connecting arm to compress the flanges of the trough and prevent sliding thereof with respect to the conveyer.

13. A loading and discharging attachment for a reciprocating conveyer comprising a trough section slidable with respect to the conveyer and stationary means mounted in frictional contact with the slidable trough on the conveyer to support the same out of contact therewith the support means being adjustable to compensate for wear thereon in order to control the spacing between the troughs.

In testimony whereof we hereunto affix our signatures.

FRANK L. McCARTY.
GEORGE H. ERNSBARGER.
JAMES V. MACDONALD.